US009952027B2

(12) United States Patent
Burch et al.

(10) Patent No.: US 9,952,027 B2
(45) Date of Patent: *Apr. 24, 2018

(54) TAPE MEASURE

(71) Applicant: Milwaukee Electric Tool Corporation, Brookfield, WI (US)

(72) Inventors: Wade F. Burch, Wauwatosa, WI (US); Scott R. Fischer, Menomonee Falls, WI (US); Michael S. Steele, Pewaukee, WI (US); Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/085,706

(22) Filed: Mar. 30, 2016

(65) Prior Publication Data

US 2016/0209197 A1 Jul. 21, 2016

Related U.S. Application Data

(63) Continuation of application No. 14/383,488, filed as application No. PCT/US2013/029309 on Mar. 6, 2013, now Pat. No. 9,322,628.

(Continued)

(51) Int. Cl.
*G01B 3/10* (2006.01)

(52) U.S. Cl.
CPC .................................. *G01B 3/1056* (2013.01)

(58) Field of Classification Search
CPC ............ G01B 3/1084; G01B 2003/102; G01B 3/1005

(Continued)

(56) References Cited

U.S. PATENT DOCUMENTS

D342,459 S * 12/1993 Shen ..................... G01B 3/1084
D10/72
5,829,152 A * 11/1998 Potter ....................... B25H 7/04
33/668

(Continued)

FOREIGN PATENT DOCUMENTS

| JP | 2007033251 | 2/2007 |
| KR | 200385910 | 6/2005 |
| KR | 100921157 | 10/2009 |

OTHER PUBLICATIONS

International Search Report and Written Opinion for PCT/US20131029309 dated Jun. 3, 2013 (12 pages).

(Continued)

*Primary Examiner* — G. Bradley Bennett
(74) *Attorney, Agent, or Firm* — Reinhart Boerner Van Deuren s.c.

(57) ABSTRACT

A tape measure includes a housing having a wall defining an internal cavity and a tape port, a coilable measuring tape disposed within the internal housing and having a first end extendable out of the housing, and an end hook member including an attachment portion and a hook portion. The attachment portion is arranged to engage the first end of the tape to attach the end hook member to the tape. The hook portion extends in a direction normal to the attachment portion and includes a first face and a second face arranged to engage the workpiece. A finger guard extends from the housing, and is configured to engage the hook member, and a finger space is defined between the tape port and the finger guard and is arranged to receive a user's finger during operation of the tape measure such that the user's finger engages the measuring tape.

20 Claims, 12 Drawing Sheets

Related U.S. Application Data

(60) Provisional application No. 61/656,297, filed on Jun. 6, 2012, provisional application No. 61/607,060, filed on Jun. 3, 2012.

(58) Field of Classification Search
USPC .................. 33/759, 760, 761, 768, 769, 770
See application file for complete search history.

(56) References Cited

U.S. PATENT DOCUMENTS

| | | | |
|---|---|---|---|
| 6,115,931 A | 9/2000 | Arcand | |
| 6,663,153 B2 | 12/2003 | Brunson | |
| 6,678,967 B1 | 1/2004 | Juenemann | |
| 7,124,515 B2 | 10/2006 | Juenemann | |
| 7,174,656 B1 * | 2/2007 | Smith | G01B 3/1084 33/668 |
| 7,266,905 B1 * | 9/2007 | Lee | G01B 3/1056 33/758 |
| 7,475,492 B1 | 1/2009 | Huang | |
| 7,669,347 B1 | 3/2010 | Huang | |
| 7,805,855 B2 | 10/2010 | Seo | |
| 8,806,770 B2 * | 8/2014 | Steele | G01B 3/1005 33/761 |
| 9,322,628 B2 * | 4/2016 | Burch | G01B 3/1056 |
| 2004/0181959 A1 | 9/2004 | Juenemann | |
| 2006/0112582 A1 * | 6/2006 | Scarborough | G01B 3/1084 33/668 |
| 2007/0074418 A1 | 4/2007 | Critelli et al. | |
| 2009/0249636 A1 * | 10/2009 | Reda | B26B 29/06 33/760 |
| 2009/0288307 A1 | 11/2009 | Zhou | |
| 2010/0175273 A1 | 7/2010 | Seo | |
| 2012/0073156 A1 | 3/2012 | DeLaRosa | |
| 2013/0025147 A1 * | 1/2013 | Steele | G01B 3/1041 33/769 |
| 2013/0047455 A1 * | 2/2013 | Steele | G01B 3/1082 33/761 |
| 2013/0133215 A1 * | 5/2013 | Bridges | G01B 3/1005 33/701 |

OTHER PUBLICATIONS

International Preliminary Report on Patentability for PCT Application No. PCT/US2013/029309 dated Sep. 18, 2014 (9 pages).

* cited by examiner

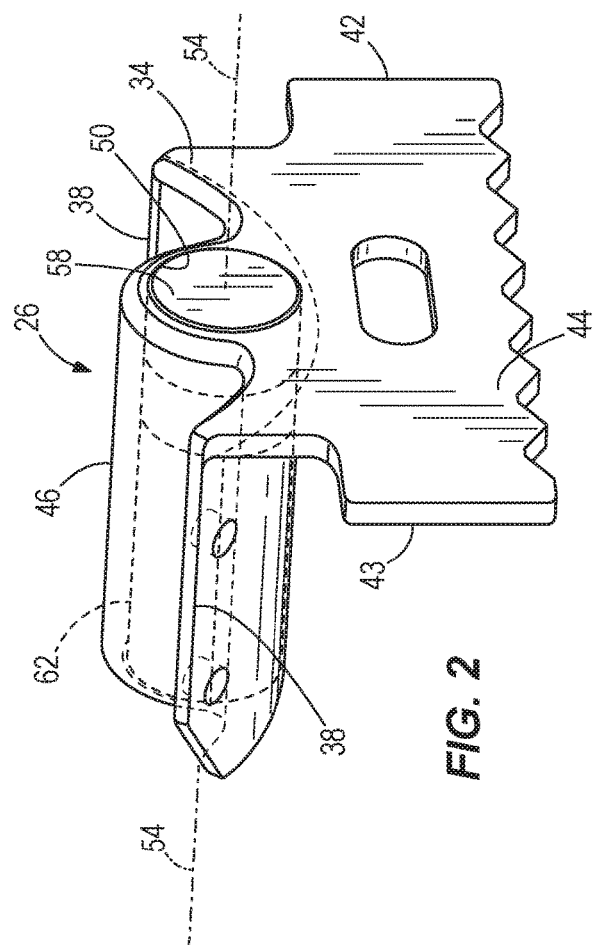
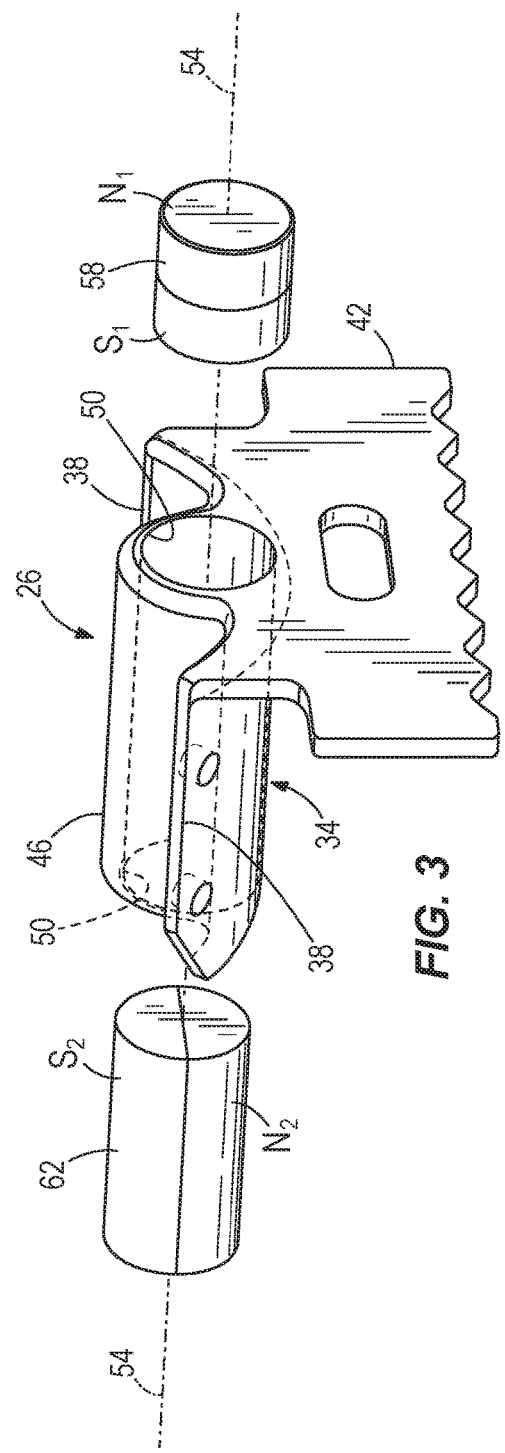
FIG. 2
FIG. 3

TAPE MEASURE

BACKGROUND

The present invention relates to measurement devices, and in particular, the invention relates to a tape measure including a magnetic hook.

SUMMARY

In one construction, the invention provides a tape measure. The tape measure includes a housing and a length of measuring tape having a first end and a second end. The first end of the measuring tape is coupled to the housing. A hook assembly is fixedly coupled to the second end of the measuring tape. The hook assembly includes a hook body having a magnet housing portion. A first magnet and a second magnet are disposed within the magnet housing portion. The first magnet has a first magnetic pole orientation and the second magnet has a second magnetic pole orientation, where the first magnetic pole orientation is substantially non-parallel to the second magnetic pole orientation.

In one construction, the invention provides a tape measure for measuring a workpiece. The tape measure includes a housing, a coilable measuring tape at least partially disposed within the housing and having a first end extendable out of the housing, and an end hook member including an attachment portion and a hook portion. The attachment portion is arranged to engage a first surface of the first end of the tape to attach the end hook member to the tape. The hook portion extends in a direction substantially normal to the attachment portion and includes a first face and a second face arranged to engage the workpiece. The second face faces outward from the end of the tape. A magnet housing is coupled to the end hook member, a first magnet is disposed within the magnet housing and arranged to magnetically engage the workpiece when the workpiece is positioned adjacent the second face, and a second magnet is disposed within the magnet housing and is arranged to magnetically engage the workpiece when the workpiece is positioned adjacent the first face.

In another construction, the invention provides a tape measure for measuring a workpiece. The tape measure includes a housing and a coilable measuring tape at least partially disposed within the housing and having a first end extendable out of the housing. The extended portion of the tape forms a concavo-convex cross section having a concave side and a convex side when extended out of the housing. An end hook member includes an attachment portion and a hook portion. The attachment portion is arranged to engage one of the concave side and the convex side of the tape to attach the end hook member to the tape. The hook portion extends in a direction substantially normal to the attachment portion and includes a first face that faces toward the tape and a second face that extends away from the tape. A magnet includes a first pole and a second pole and is arranged to present the first pole in a plane substantially parallel to the second face to magnetically attract the workpiece when the workpiece is positioned adjacent the second face and to present one of the first pole and the second pole along a portion of the extended portion of the tape to magnetically engage the workpiece when the workpiece is positioned adjacent the tape and the first face.

In another construction, the invention provides a tape measure for measuring a workpiece. The tape measure includes a housing and a coilable measuring tape at least partially disposed within the housing and having a first end extendable out of the housing. The extended portion of the tape forms a concavo-convex cross section having a concave side and a convex side when extended out of the housing. An end hook member includes an attachment portion and a hook portion. The attachment portion is arranged to engage the concave side of the first end of the tape to attach the end hook member to the tape. The hook portion extends in a direction substantially normal to the attachment portion and includes a first face and a second face arranged to engage the workpiece. The second face faces outward from the end of the tape. A magnet housing is coupled to the end hook member and is disposed within the concave side of the first end of the tape, a first magnet disposed within the magnet housing and including a substantially planar surface that is substantially parallel to the second face and arranged to magnetically engage the workpiece when the workpiece is positioned adjacent the second face; and a second magnet disposed within the magnet housing and arranged to magnetically engage the workpiece in a direction normal to the planar surface of the first magnet when the workpiece is positioned adjacent the first face.

In another construction, a tape measure for measuring a workpiece includes a housing having a wall defining an internal cavity and a tape port, a coilable measuring tape at least partially disposed within the internal housing and having a first end extendable out of the housing through the tape port, and an end hook member including an attachment portion and a hook portion. The attachment portion is arranged to engage the first end of the tape to attach the end hook member to the tape. The hook portion extends in a direction substantially normal to the attachment portion and includes a first face and a second face arranged to engage the workpiece, the second face facing outward from the end of the tape. A finger guard extends from the housing, and is configured to engage the hook member when the measuring tape is fully retracted and a finger space is defined between the tape port and the finger guard and is arranged to receive a user's finger during operation of the tape measure such that the user's finger slidingly engages the measuring tape.

In another construction, a method of controlling the movement of a tape from a tape measure includes extending the tape from a tape port in the housing, the housing including a front surface and a bottom surface, the tape port being adjacent the bottom surface and set back a first distance from the front surface and passing the tape through a finger guard disposed adjacent the front surface, the tape including an end hook that engages the finger guard to inhibit retraction of the tape completely into the tape port, the finger guard and the tape port defining a finger space having a length of about the first distance. The method also includes positioning a user's finger in the finger space such that the user's finger is in contact with the tape as the tape passes between the finger guard and the tape port and applying pressure to the tape using the user's finger to stop movement of the tape and to maintain the tape in an extended position.

In yet another construction, a tape measure for measuring a workpiece includes a housing having a wall defining an internal cavity, the wall including a front surface and a bottom surface, a tape port formed in the housing adjacent the bottom surface and set back a first distance from the front surface. A coilable measuring tape is at least partially disposed within the internal housing and has a first end extendable out of the housing through the tape port. An end hook member includes an attachment portion and a hook portion, the attachment portion arranged to engage the first end of the tape to attach the end hook member to the tape, the hook portion extending in a direction substantially normal to the attachment portion. A finger guard is positioned adjacent the front surface and extends from the housing to the bottom surface, the finger guard defining an opening sized to allow passage of the tape and to inhibit passage of the hook portion of the end hook member. A recessed housing portion is formed between the tape port and the finger guard, the recessed housing portion spaced a second distance from the bottom surface of the housing, the second distance measured in a direction substantially normal to the first direction. A finger space is defined in a first direction between the finger guard and the tape port and in a second direction between the bottom surface and the recessed surface, the finger guard sized to receive a user's finger and inhibit contact between the user's finger and the hook portion when the user's finger is disposed in the finger space during tape usage.

Other aspects of the invention will become apparent by consideration of the detailed description and accompanying drawings.

BRIEF DESCRIPTION OF THE DRAWINGS

FIG. 2 is a perspective view of a hook assembly of the tape measure of FIG. 1, with the hook member illustrated transparently to illustrate an arrangement of magnets.

FIG. 3 is an exploded, perspective view of the hook assembly of FIG. 2.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
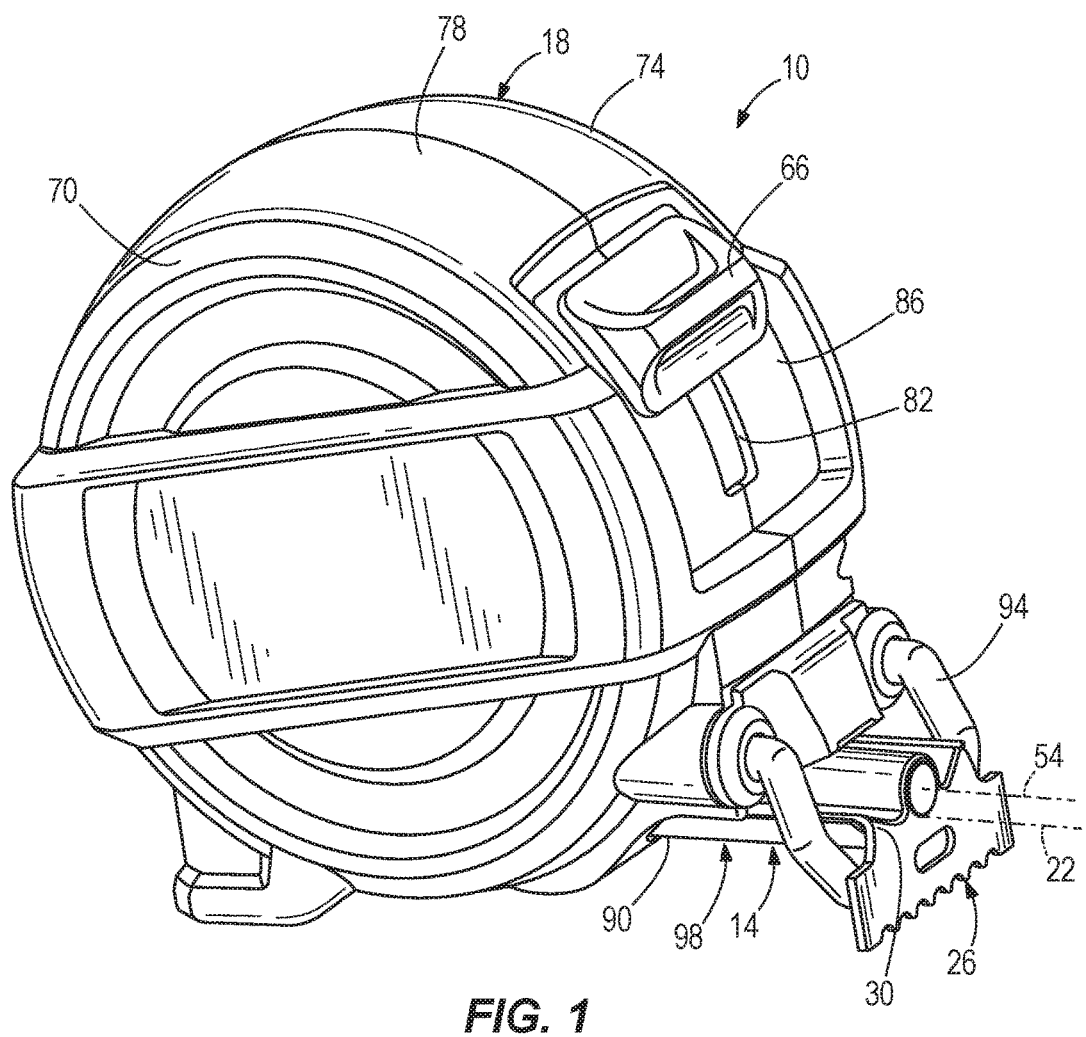
FIG. 1 is a perspective view of a tape measure according to one construction of the invention.

FIG. 1 illustrates a length measurement device, more specifically, a tape measure 10. The tape measure 10 includes a coilable measuring tape 14 that is at least partially disposed within a housing assembly 18.

As illustrated in FIG. 1, a variable-length segment of the measuring tape 14 is retractable and extendable from the housing assembly 18 along a tape axis 22. When extracted, the extended portion of the tape forms a concavo-convex cross sectional shape (best illustrated in FIG. 6) that includes a concave or top surface of the tape 14 and a convex or bottom surface of the tape 14. At least the top surface 14 includes indicia for taking measurements.

A hook assembly 26, or end hook member is fixedly coupled to an end portion 30 of the measuring tape 14. Referring to FIGS. 2 and 3, the hook assembly 26 includes a hook body 34. The hook body 34 includes attachment portions 38 for riveting or otherwise fastening the hook body 34 to the end portion 30 of the tape 14. In preferred constructions, the attachment portions 38 form a concavo-convex cross section similar to that of the tape 14. A hook tab 42 extends substantially perpendicular to the attachment portions 38 and defines a first face 43 that faces toward the tape and a second face 44 that faces outward or away from the tape 14. The hook tab 42 is configured to engage an end portion of a workpiece to be measured, such as a board or beam. The hook tab 42 defines serrations for additional engagement with the workpiece. In some constructions, a single attachment portion extends along the center of the tape and facilitates the attachment of the hook assembly 26 to the tape.

Referring to FIG. 3, the hook body 34 additionally includes a magnet housing 46 disposed between the attachment portions 38. In the illustrated construction, the magnet housing 46 defines a circular bore 50 extending through the hook body 34 along a magnet axis 54. The magnet axis 54 is substantially parallel to the tape axis 22 (FIG. 1). In other constructions, the bore may be a blind hole with a closed end portion.

Referring to FIGS. 2 and 3, a first magnet 58 and a second magnet 62 are disposed within the magnet housing 46. As shown in FIG. 3, the first magnet 58 and the second magnet 62 are disposed entirely within the bore 50. In other constructions, the magnets 58 and 62 may extend beyond the bore 50.

Figure 4:
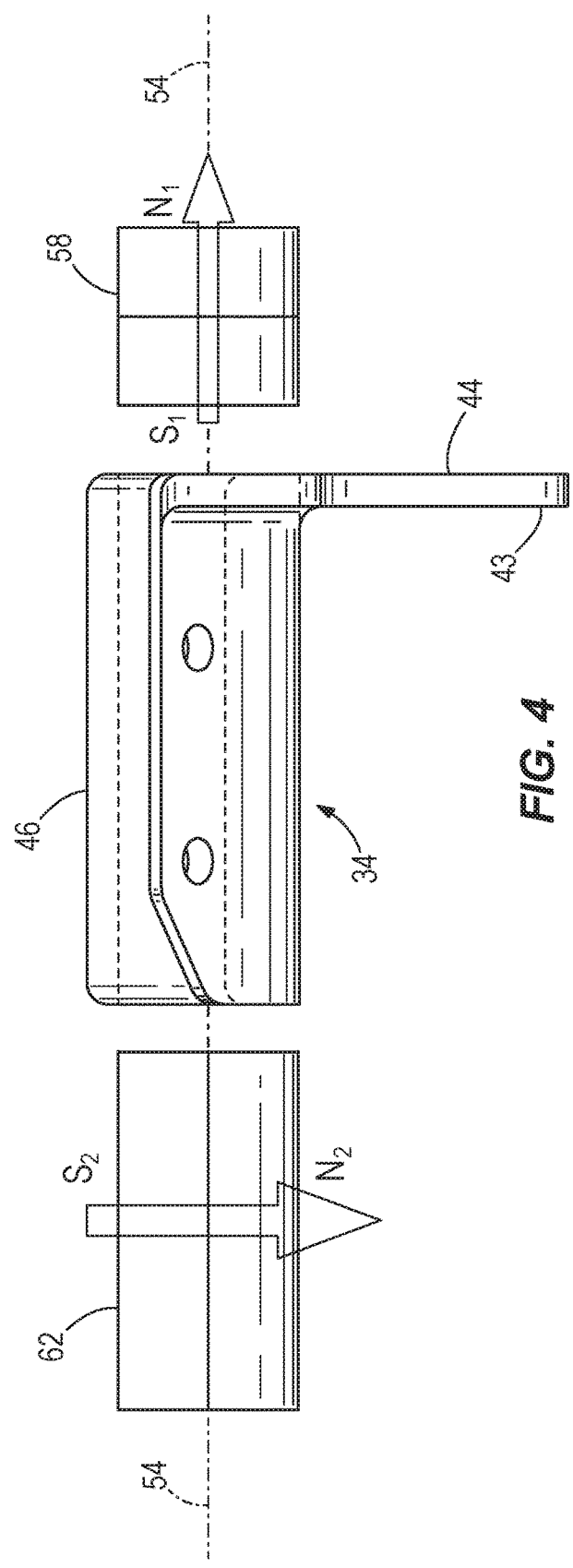
FIG. 4 is an exploded side view of the hook assembly of FIG. 3, showing magnetic pole orientations.
Figure 7:
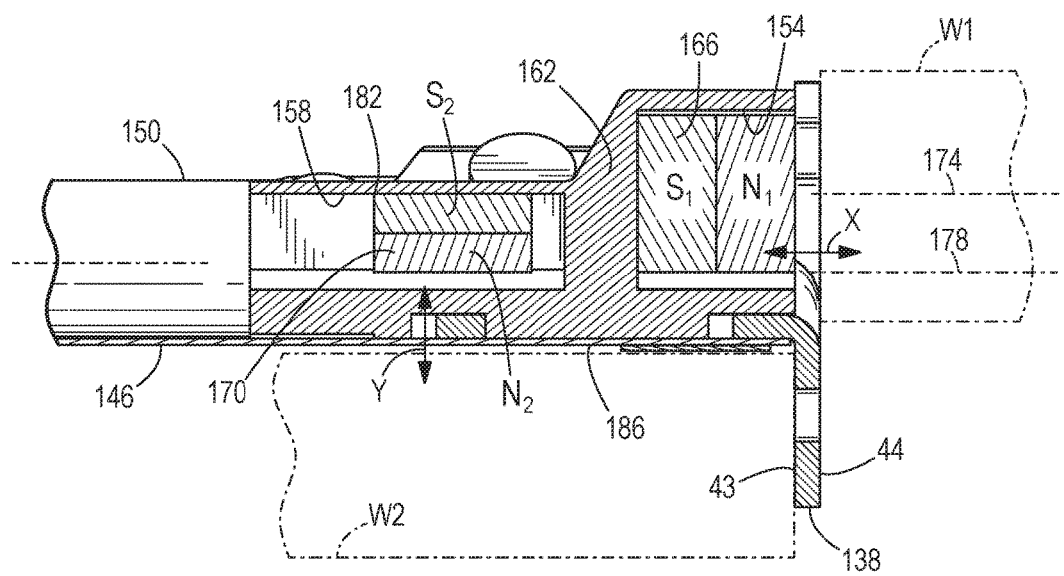
FIG. 7 is a cross-sectional view of the hook assembly of FIG. 9, along section 10-10.

Referring to FIG. 4, the first magnet 58 is magnetized with its north and south magnetic poles, $N_1$ and $S_1$, respectively, oriented along the magnet axis 54. The first magnet 58 is so oriented to provide a significant magnetic pull toward metal objects placed in front of the hook assembly 26. The second magnet 62 is magnetized with its north and south poles, $N_2$ and $S_2$, respectively, oriented perpendicular to the magnet axis 54. The second magnet 62 is so oriented to provide a significant magnetic pull toward metal objects placed alongside top or bottom surfaces of the hook assembly 26. For example, FIG. 7 illustrates a workpiece "W1" in a first position in which the first magnet is attracted to it in the direction of arrow "X". A workpiece "W2" is also shown in a second position in which the second magnet attracts the workpiece in the direction of arrow "Y". Thus, the first magnet attracts workpieces positioned adjacent the second face 44 beyond the end of the tape 14, while the second magnet attracts the workpiece when it is positioned adjacent the first face 43 and the tape 14.

Referring back to FIG. 1, a second end of the measuring tape 14 is coupled to the housing assembly 18. The measuring tape 14 forms a spool disposed within a cavity of the housing assembly 18. A retraction mechanism is coupled to the spool to provide for powered retraction of the measuring tape 14. The retraction mechanism may include an elongated coiled spring for motive force. A tape lock 66 is provided to selectively engage at least one of the spool and the retraction mechanism, such that the extended segment 22 of the measuring tape 14 remains at a desired length.

The housing assembly 18 includes a first side wall 70, a second side wall 74, and a peripheral wall 78 connecting the first side wall 70 and the second side wall 74. Each of the first side wall 70 and the second side wall 74 has a substantially circular profile. In other constructions, the side walls 70 and 74 may be rectangular or another polygonal shape. Portions of the housing assembly 18 may be co-molded or separately formed of a resilient material, such as a natural or synthetic rubber, forming housing bumpers.

A slot 82 is defined along a forward portion 86 of the peripheral wall 78. The slot 82 is provided to allow for sliding movement of the tape lock 66 relative to housing assembly 18. Below the slot 82, a tape port 90 is provided in the peripheral wall 78. The tape port 90 allows for the retraction and extension of the measuring tape 14 to and from the internal cavity.

A guard member 94 is coupled to the housing assembly 18 adjacent the tape port 90. As shown in FIG. 2, the guard member 94 is U-shaped and is configured to engage the hook assembly 26 when the measuring tape 14 is fully retracted. The guard member 94 shields the housing assembly 18 from being struck by the hook assembly 26. The guard member 94 also shields a user's fingers from being struck by the hook assembly 26 when the measuring tape 14 is rapidly retracted into the housing assembly 18. A gap 98 defined between the tape port 90 and the guard member 94 allows a user's finger to slidingly engage the measuring tape 14 during retraction, thereby allowing the user to control a rate at which the tape 14 is retracted into the housing assembly 18.

Figure 5:
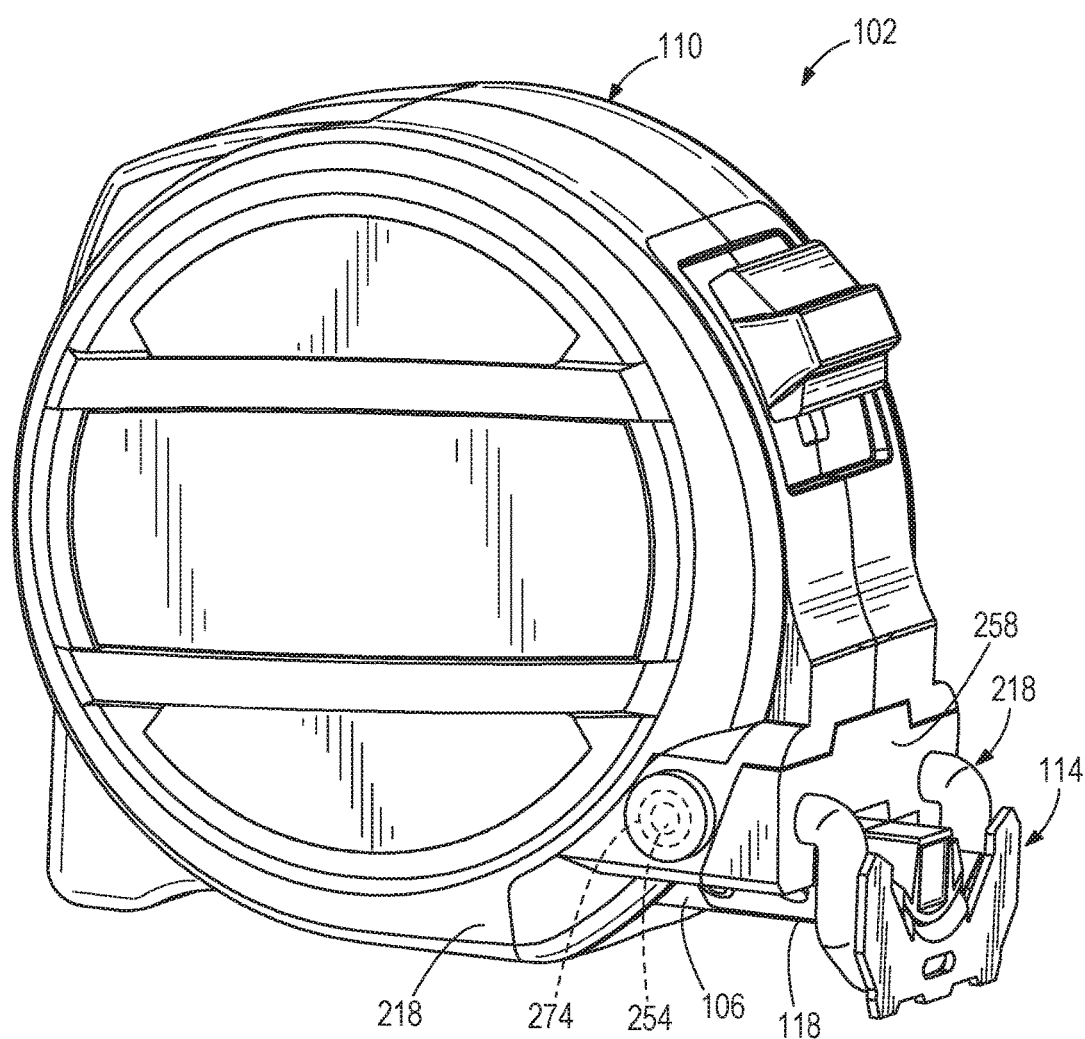
FIG. 5 is a perspective view of a tape measure according to another construction of the invention.

FIG. 5 illustrates a tape measure 102 according to another embodiment of the invention. Various aspects of the tape measure 102 are similar to those of the tape measure 10, and only those aspects that differ are described herein. The tape measure 102 includes a coilable measuring tape 106 and a housing assembly 110.

Figure 6:
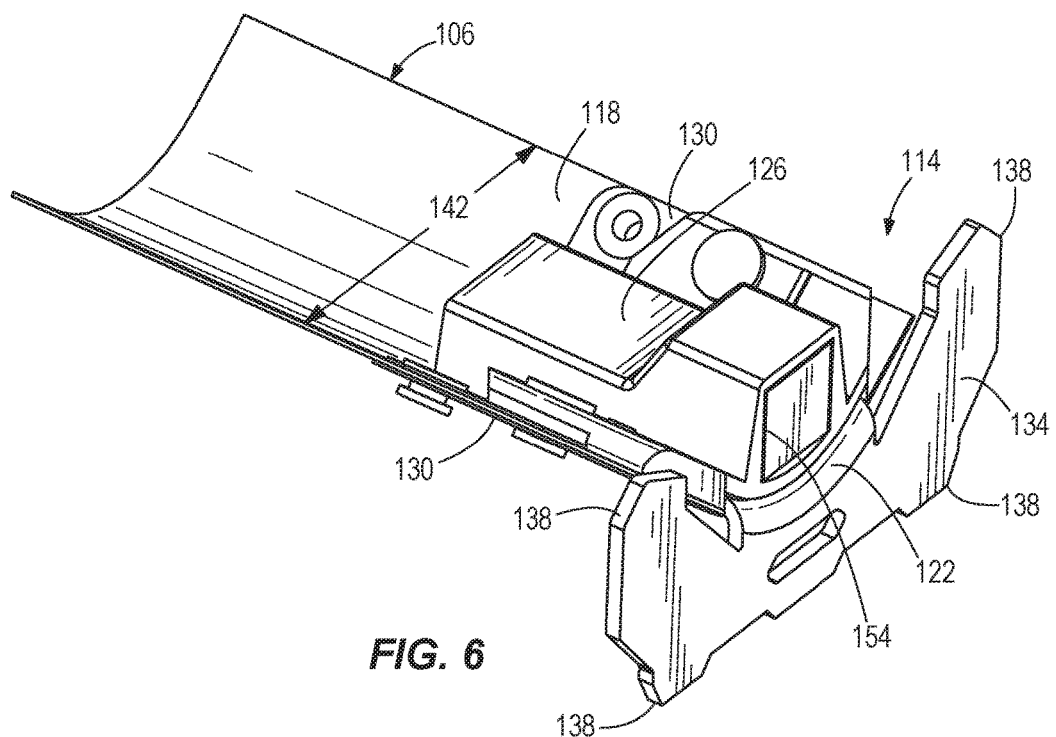
FIG. 6 is a perspective view of a portion of a measuring tape and a hook assembly of the tape measure of FIG. 5.

A hook assembly 114 is fixedly coupled to an end portion 118 of the measuring tape 106. Referring to FIG. 6, the hook assembly 114 includes a hook body 122 and a magnet housing 126. The hook body 122 includes attachment portions 130 for riveting or otherwise fastening the hook body 122 to the end portion 118 of the tape 106. A hook tab 134 extends substantially perpendicular to the attachment portions 130. The hook tab 134 includes extension portions 138 that extend beyond a lateral width 142 of the measuring tape 106, and, referring to FIG. 7, beyond first and second planes 146 and 150 of the measuring tape 106. The extension portions 138 facilitate engaging the hook tab 134 with various work pieces and in various orientations. The hook body 122 may be formed, for example, of stamped steel or other metals.

Referring to FIG. 6, the magnet housing 126 defines a first magnet recess 154 with a polygonal (e.g., square) cross-section. Referring to FIG. 7, the magnet housing 126 defines a second magnet recess 158 with a polygonal (e.g., rectangular) cross section. The first magnet recess 154 and the second magnet recess 158 are separated by a baffle wall 162. The magnet housing 126 may be formed, for example, of injection molded plastic.

A first magnet 166 is disposed in the first magnet recess 154. A second magnet 170 is disposed within the second magnet recess 158. The first magnet 166 is magnetized with its north and south magnetic poles, $N_1$ and $S_1$, respectively, oriented along a magnet axis 174 that is substantially parallel to a tape axis 178. The first magnet 166 is so oriented to provide a significant magnetic pull toward metal objects placed in front of the hook assembly 114. The second magnet 170 is magnetized with its north and south poles, $N_2$ and $S_2$, respectively, oriented perpendicular to the magnet axis 174. The second magnet 170 is so oriented to provide a significant magnetic pull toward metal objects placed alongside top or bottom surfaces 182 or 186 of the hook assembly 114. Virtually any magnet material could be employed as the magnets 58, 62, 166, 170 (e.g., metal alloys, rare earths, ceramics, bonded magnets, etc.).

Figure 8:
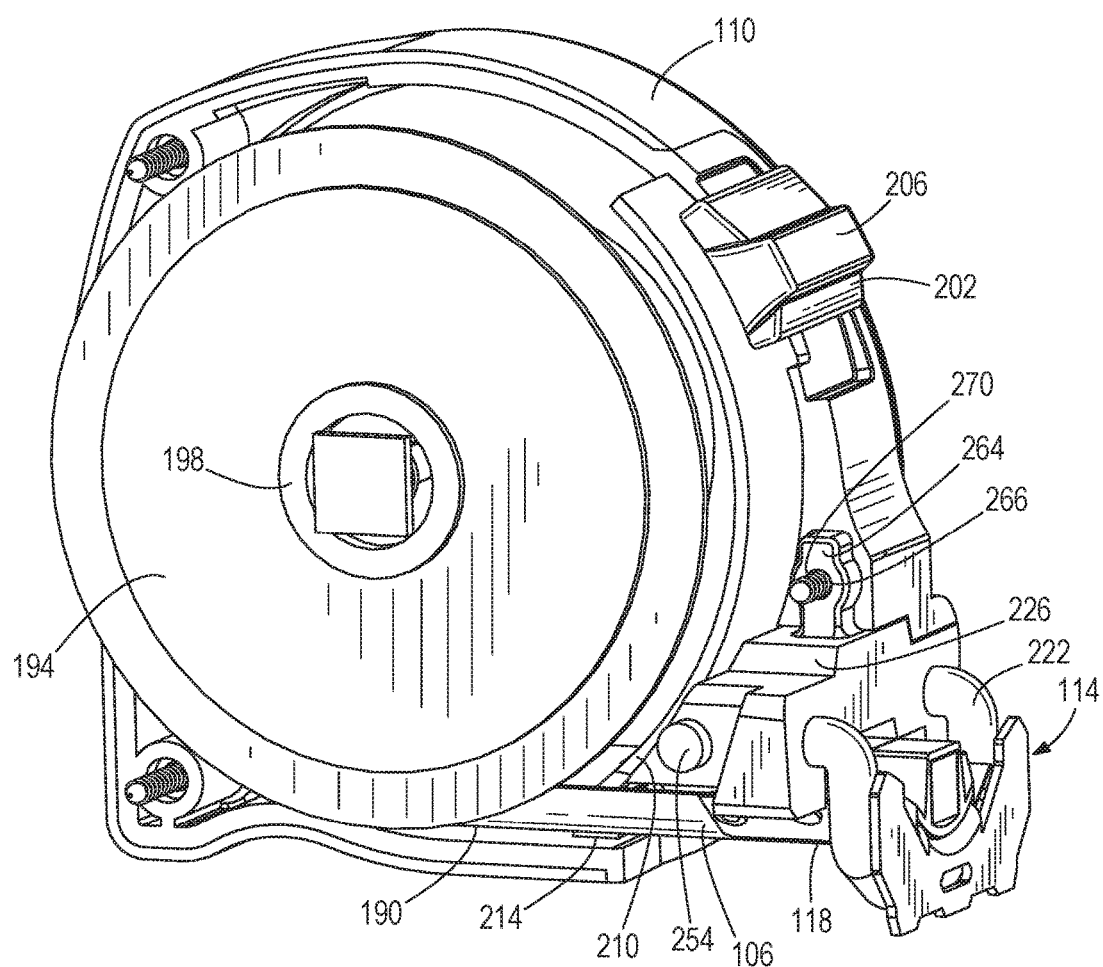
FIG. 8 is a cutaway view of the tape measure of FIG. 5.

Referring to FIG. 8, a second end 190 of the measuring tape 106 is coupled to a spool assembly 194 disposed with the housing assembly 110. A retraction mechanism 198 is coupled to the spool assembly 194 to provide for powered retraction of the measuring tape 106. A tape lock 202 is slidably coupled to the housing assembly 110 and includes an actuation portion 206 and an engagement portion 210. The engagement portion 210 selectively engages the measuring tape 106 and compresses the measure tape 106 into a friction member 214, thereby inhibiting the measuring tape 106 from retracting into the housing assembly 110. The friction member 214 may be formed as an extension of an overmold layer 218 on the housing assembly 110 (FIG. 5).

Figure 9:
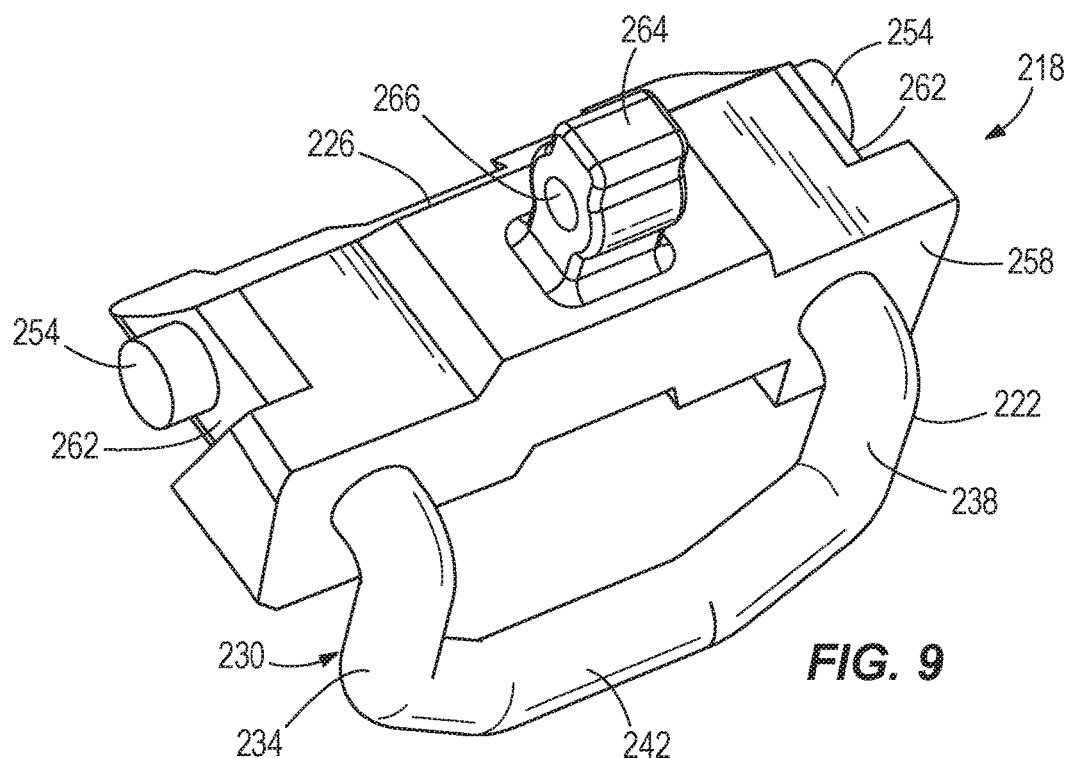
FIG. 9 is a perspective view of a finger guard assembly of the tape measure of FIG. 5.
Figure 10:
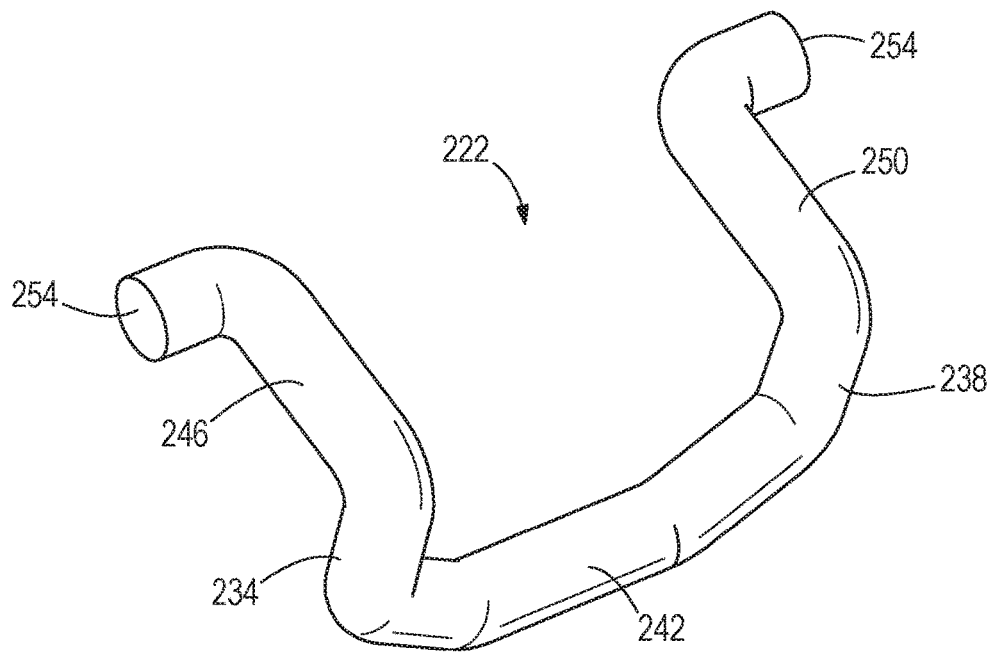
FIG. 10 is a perspective view of a finger guard member of the finger guard assembly of FIG. 9.

The tape measure 102 also includes a finger guard assembly 218. Referring to FIG. 9, the finger guard assembly 218 includes a guard member 222 and a guard support member 226. Exposed portions 230 of the guard member 222 are substantially U-shaped, with a first leg 234 and a second leg 238 extending from the guard support member 226, and a connecting leg 242 extending between first leg 234 and the second leg 238. Referring to FIG. 10, a first mounting extension 246 is coupled to the first leg 234, and a second mounting extension 250 is coupled to the second leg 238. Each of the first mounting extension 246 and the second mounting extension 250 includes a mounting boss 254. The guard member 222 may be formed of substantially rigid material such as a metal.

Referring to FIG. 9, the guard support member 226 is molded over the first mounting extension 246 and the second mounting extension 250 of the guard member 222, such that the exposed portions 230 of the guard member 222 extend from a forward surface 258 of the guard support member 226. The mounting bosses 254 extend outwardly from lateral edges 262 of the guard support member 226.

The guard support member 226 further includes a fastener boss 264. Referring to FIG. 8, the fastener boss 264 defines an aperture 266 for receiving a fastener 270 for coupling the guard support member 226 to the housing assembly 110. The mounting extensions 246 and 250 of the guard member 222 are received by corresponding recesses 274 (FIG. 5) formed in the housing assembly 110. The guard support member 226 may be formed of a resilient polymer or rubber material, such that the guard support member 226 provides a degree of impact resistance between the guard member 222 and the housing assembly 110 when the guard member 222 is struck by the hook assembly 114 or the tape measure 102 is dropped upon the guard member 222. Additionally, the guard support member 226 can rotate relative to the housing about the fastener 270 when an impact is received by the guard member 222.

Figure 11:
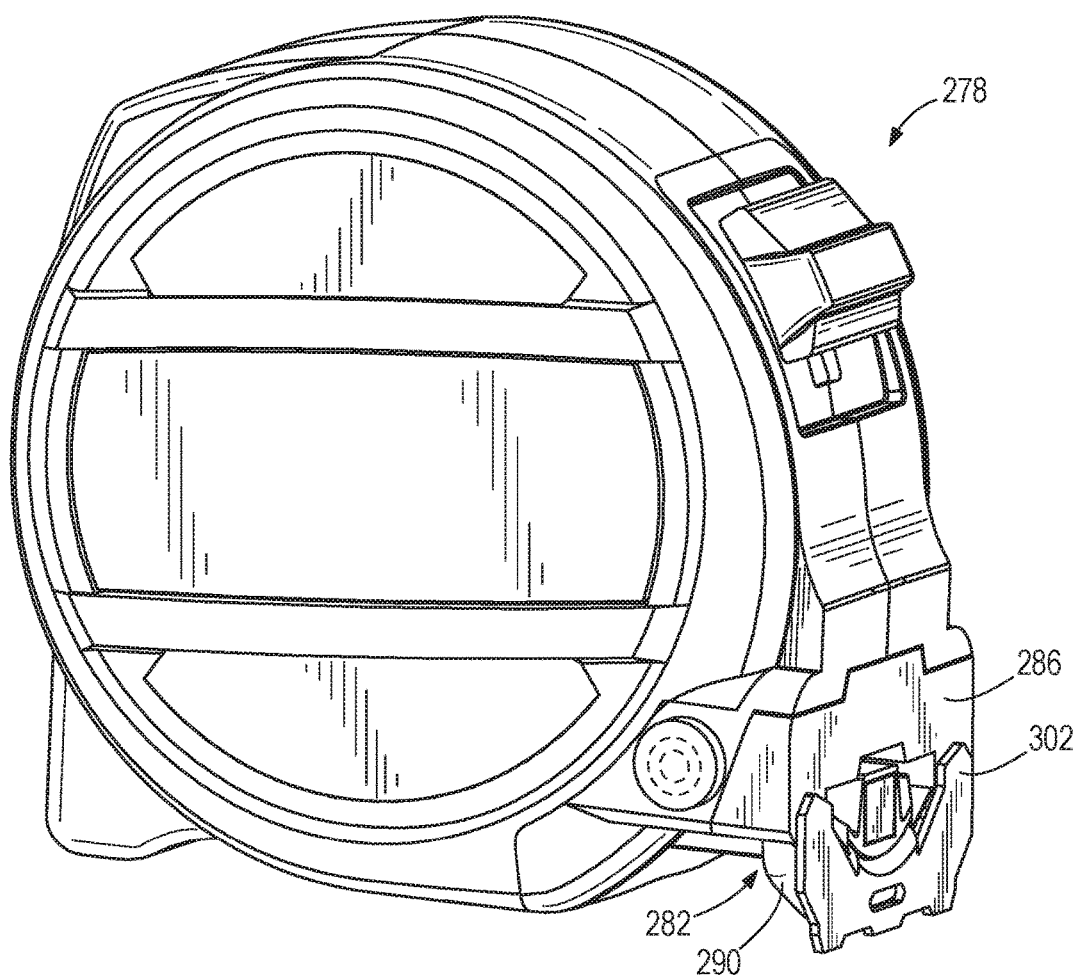
FIG. 11 is a perspective view of a tape measure according to another embodiment of the invention.

FIG. 11 illustrates a tape measure 278 according to another embodiment of the invention. Various aspects of the tape measure are similar to those of the tape measure 102, and only those aspects that differ are described herein.

Figure 12:
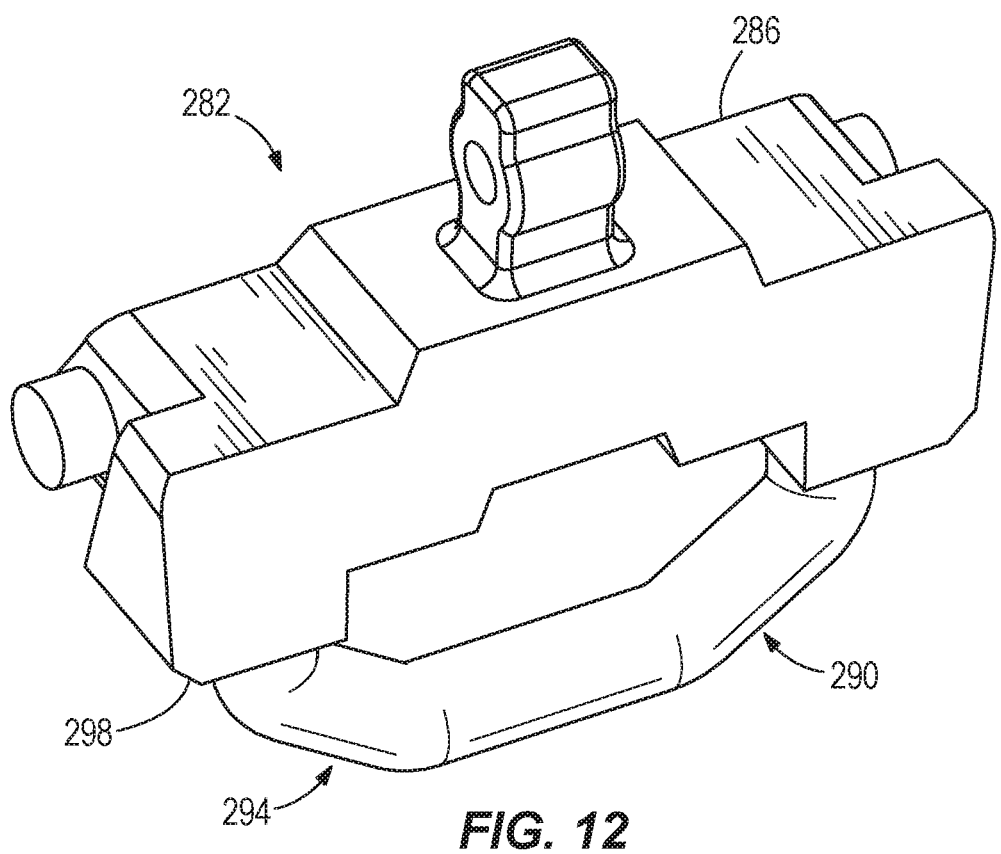
FIG. 12 is a perspective view of a finger guard assembly of the tape measure of FIG. 11.
Figure 13:
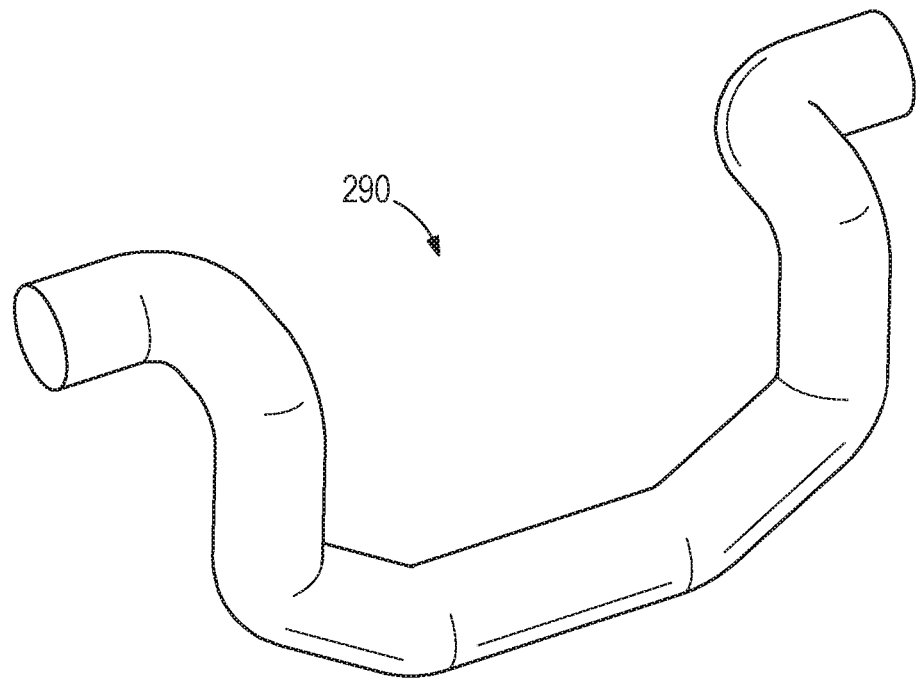
FIG. 13 is a perspective view of a finger guard member of the finger guard assembly of FIG. 12.

The tape measure 278 includes a finger guard assembly 282. Referring to FIG. 12, the finger guard assembly 282 includes a guard support member 286 and a guard member 290 (FIG. 13). A U-shaped portion 294 of the guard member 290 extends through a bottom surface 298 of the guard support member 286 (FIG. 12). Referring back to FIG. 11, the finger guard assembly 282 is configured such that a hook member 302 strikes the guard support member 286, as opposed to the guard member 290, of the finger guard assembly 282. The guard support member 286 may be formed of an impact resistant material such as a resilient polymer or rubber.

Figure 14:
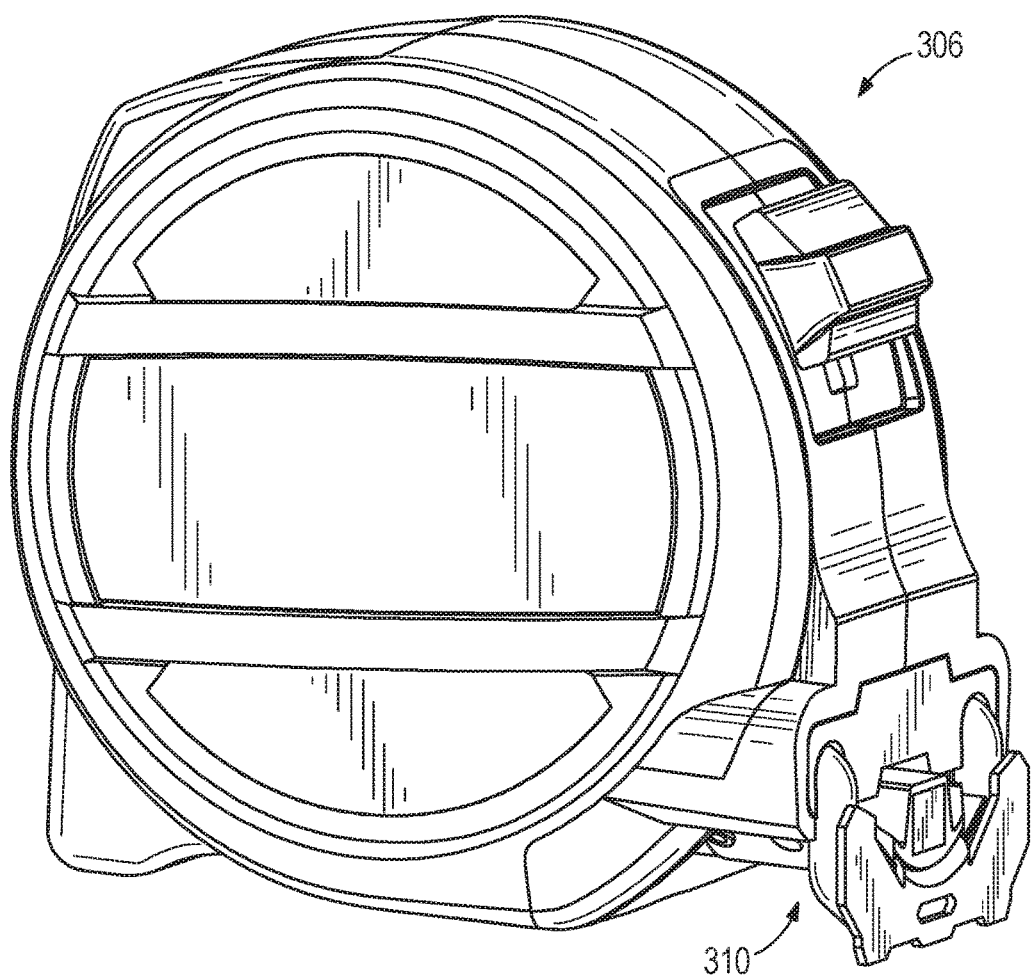
FIG. 14 is a perspective view of a tape measure according to another embodiment of the invention.

FIG. 14 illustrates a tape measure 306 according to yet another embodiment of the invention. Various aspects of the tape measure 306 are similar to those of the tape measures 102 and 278, and only those aspects that differ are described herein.

Figure 15:
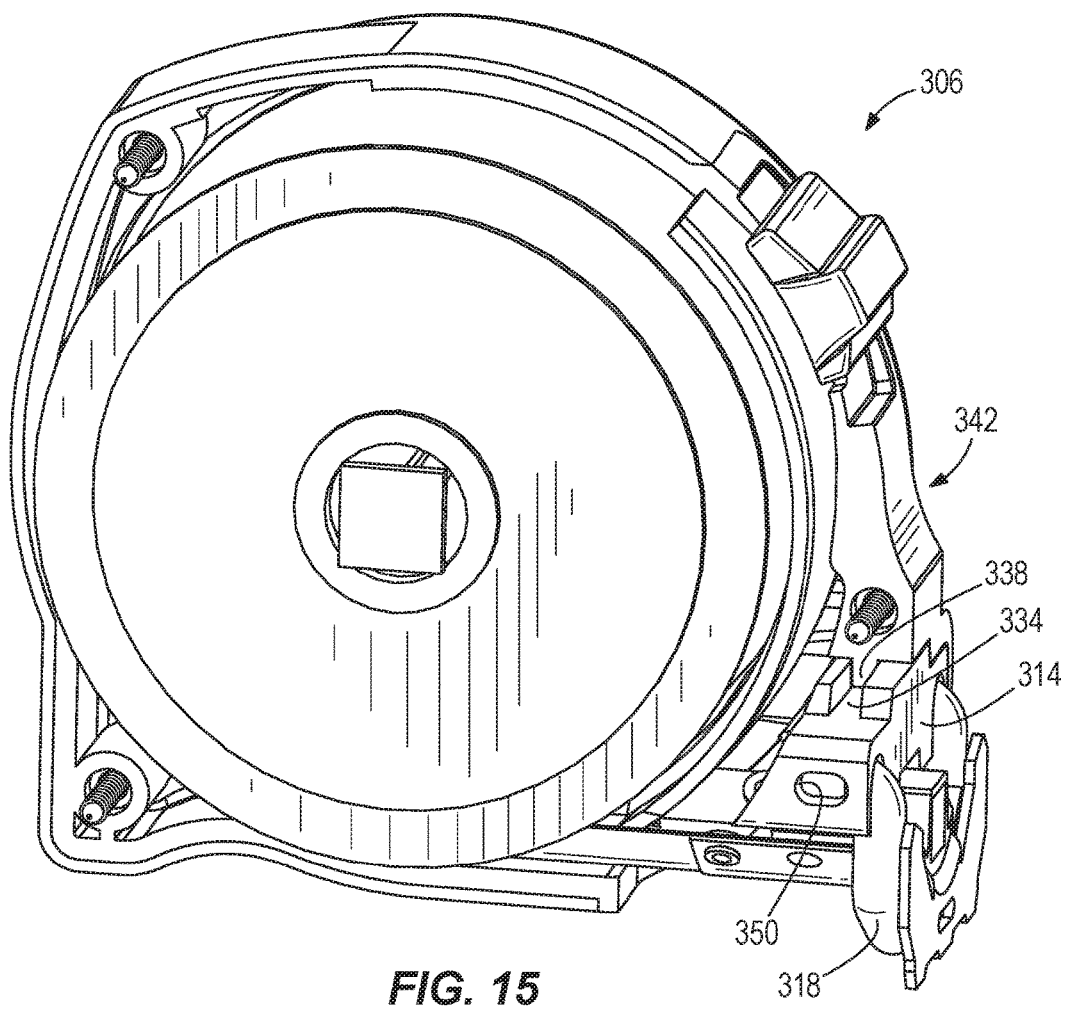
FIG. 15 is a cutaway view of the tape measure of FIG. 14.
Figure 16:
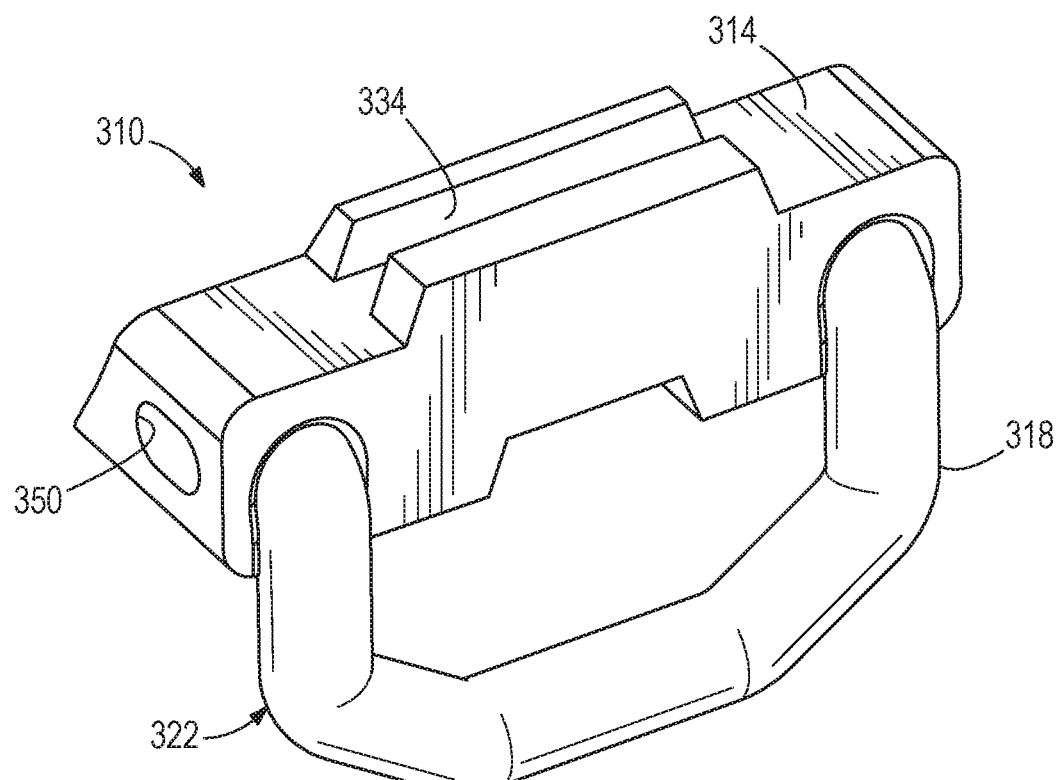
FIG. 16 is a perspective view of a finger guard assembly of the tape measure of FIG. 14.
Figure 17:
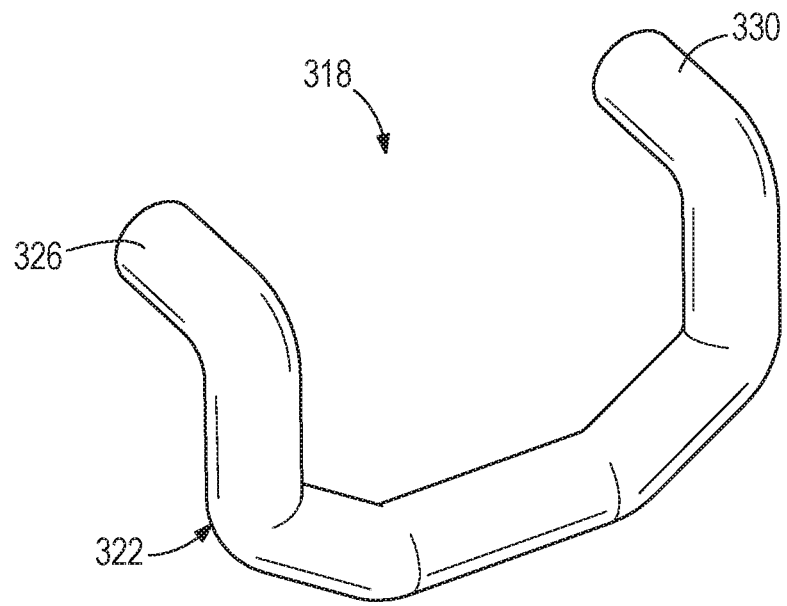
FIG. 17 is a perspective view of a finger guard member of the finger guard assembly of FIG. 15.

The tape measure 306 includes a finger guard assembly 310. Referring to FIG. 16, the finger guard assembly 310 includes a guard support member 314 and a guard member 318. The guard member 318 includes a U-shaped, exposed portion 322 and, referring to FIG. 17, a first extension member 326 and a second extension member 330. Referring to FIG. 16, the guard support member 314 is molded over first extension member 326 and the second extension member 330, such that the guard member 318 is substantially supported by the guard support member. The guard support member 314 defines a lateral groove 334. Referring to FIG. 15, the lateral groove 334 is configured to receive a tongue member 338 of a housing assembly 342, with the lateral groove 334 and the tongue member 338 defining a tongue and groove arrangement 346. The guard support member 314 further defines mounting recesses 350. The mounting recesses 350 are configured to receive corresponding mounting bosses defined by the housing assembly 342. The guard support member 314 may be formed of an impact resistant material such as a resilient polymer or rubber. By acting as a resilient interface between the guard member 314 and the housing assembly 342, the guard support member 314 substantially reduces the transfer of impact forces between the housing assembly 342 and guard member 318.

Thus, the invention provides, among other things, a tape measure. Although the invention has been described in detail with reference to certain preferred constructions, variations and modifications exist within the scope and spirit of one or more independent aspects of the invention as described.

The invention claimed is:

1. A tape measure for measuring a workpiece, the tape measure comprising:
   a housing having a wall defining an internal cavity and a tape port;
   a coilable measuring tape at least partially disposed within the internal housing and having a first end extendable out of the housing through the tape port;
   an end hook member including an attachment portion and a hook portion, the attachment portion arranged to engage the first end of the tape to attach the end hook member to the tape, the hook portion extending in a direction substantially normal to the attachment portion and including a first face and a second face arranged to engage the workpiece, the second face facing outward from the end of the tape; and
   a finger guard extending from the housing, the finger guard configured to engage the hook member when the measuring tape is fully retracted; and
   a finger space defined between the tape port and the finger guard and arranged to receive a user's finger during operation of the tape measure such that the user's finger slidingly engages the measuring tape.

2. The tape measure of claim 1, wherein the first face contacts the finger guard when the tape is fully retracted.

3. The tape measure of claim 1, wherein the finger guard comprises a guard member and a guard support member supporting the guard member in the housing.

4. The tape measure of claim 3, wherein the guard member includes a U-shaped guard member.

5. The tape measure of claim 3, wherein the guard member is formed of metal.

6. The tape measure of claim 3, wherein the guard support member is formed of an impact resistant material.

7. The tape measure of claim 3, wherein the guard support member is formed of a material that is more resilient than the housing and the finger guard.

8. The tape measure of claim 1, wherein the finger space extends in a first direction between the tape port and the finger guard, and wherein the housing includes a lowermost surface, and the finger space is recessed above the lowermost surface into the housing to provide space for the user's finger in a second direction substantially normal to the first direction.

9. The tape measure of claim 1, wherein the finger guard inhibits contact between the end hook member and the user's finger when the user's finger is positioned within the finger space.

10. A method of controlling the movement of a tape from a tape measure, the method comprising:
    extending the tape from a tape port in the housing, the housing including a front surface and a bottom surface, the tape port being adjacent the bottom surface and set back a first distance from the front surface;
    passing the tape through a finger guard disposed adjacent the front surface, the tape including an end hook that engages the finger guard to inhibit retraction of the tape completely into the tape port, the finger guard and the tape port defining a finger space having a length of about the first distance;
    positioning a user's finger in the finger space such that the user's finger is in contact with the tape as the tape passes between the finger guard and the tape port; and
    applying pressure to the tape using the user's finger to stop movement of the tape and to maintain the tape in an extended position.

11. The method of claim 10, further comprising squeezing the tape between the user's finger and the housing to inhibit movement of the tape.

12. The method of claim 10, further comprising preventing contact between the end hook and the user's finger when the user's finger is positioned in the finger space.

13. A tape measure for measuring a workpiece, the tape measure comprising:
    a housing having a wall defining an internal cavity, the wall including a front surface and a bottom surface, a tape port formed in the housing adjacent the bottom surface and set back a first distance from the front surface;
    a coilable measuring tape at least partially disposed within the internal housing and having a first end extendable out of the housing through the tape port;
    an end hook member including an attachment portion and a hook portion, the attachment portion arranged to engage the first end of the tape to attach the end hook member to the tape, the hook portion extending in a direction substantially normal to the attachment portion;
a finger guard positioned adjacent the front surface and extending from the housing to the bottom surface, the finger guard defining an opening sized to allow passage of the tape and to inhibit passage of the hook portion of the end hook member;
a recessed housing portion formed between the tape port and the finger guard, the recessed housing portion spaced a second distance from the bottom surface of the housing, the second distance measured in a direction substantially normal to the first direction; and
a finger space defined in a first direction between the finger guard and the tape port and in a second direction between the bottom surface and the recessed surface, the finger guard sized to receive a user's finger and inhibit contact between the user's finger and the hook portion when the user's finger is disposed in the finger space during tape usage.

14. The tape measure of claim 13, wherein the user's finger slidingly engages the measuring tape in the finger space.

15. The tape measure of claim 13, wherein the hook portion engages the finger guard when the coilable measuring tape is fully retracted.

16. The tape measure of claim 13, wherein the finger guard comprises a guard member and a guard support member supporting the guard member in the housing.

17. The tape measure of claim 13, wherein the guard member is formed from a substantially rigid material and wherein the guard support member is formed from a material that is more resilient than the housing and the guard member.

18. The tape measure of claim 13, wherein the guard member includes a metal portion.

19. The tape measure of claim 13, wherein the tape passes between the user's finger and the recessed portion of the housing within the finger space, and wherein the application of pressure to the tape at the user's finger inhibits retraction of the tape.

20. The tape measure of claim 19, wherein the application of pressure sandwiches the tape between the housing and the user's finger to inhibit movement of the tape.

* * * * *